(12) United States Patent
Kobayashi

(10) Patent No.: US 11,546,455 B2
(45) Date of Patent: Jan. 3, 2023

(54) CASING ANGLE ADJUSTMENT MECHANISM AND ELECTRONIC DEVICE

(71) Applicant: NEC Platforms, Ltd., Kawasaki (JP)

(72) Inventor: Masaki Kobayashi, Kawasaki (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/043,511

(22) PCT Filed: Jun. 23, 2020

(86) PCT No.: PCT/JP2020/024679
§ 371 (c)(1),
(2) Date: Sep. 29, 2020

(87) PCT Pub. No.: WO2021/024635
PCT Pub. Date: Feb. 11, 2021

(65) Prior Publication Data
US 2022/0159115 A1    May 19, 2022

(30) Foreign Application Priority Data

Aug. 8, 2019   (JP) .............................. JP2019-146293

(51) Int. Cl.
*F16M 11/00*    (2006.01)
*H04M 1/12*     (2006.01)
(Continued)

(52) U.S. Cl.
CPC .............. *H04M 1/12* (2013.01); *F16M 11/10* (2013.01); *G06F 1/166* (2013.01)

(58) Field of Classification Search
CPC .......... H04M 1/04; H04M 1/12; F16M 11/10; F16M 11/38; G06F 1/166
See application file for complete search history.

(56) References Cited

U.S. PATENT DOCUMENTS 5,607,135 A * 3/1997 Yamada ............... A47G 1/1646
248/463
7,104,516 B2 * 9/2006 Uto ........................ F16M 11/10
248/688
(Continued)

FOREIGN PATENT DOCUMENTS

JP         06-069994 A     3/1994
JP         2008-115925 A   5/2008
(Continued)

OTHER PUBLICATIONS

Supplementary European Search Report (ESR) for EP Application No. EP20786221.0 dated Jun. 2, 2021.
(Continued)

*Primary Examiner* — Amy J. Sterling
(74) *Attorney, Agent, or Firm* — Sughrue Mion, PLLC

(57) ABSTRACT

A casing angle adjustment mechanism capable of adjusting the angle of a casing with respect to a mounting surface by a simple operation of a leg unit is provided. When an angle adjustment mechanism of a casing rotates a leg unit in one direction, moves a part of a stopper along a connection hole of the leg unit, and slides a slide plate, a side wall of the slide plate blocks openings of engagement holes of the leg unit, and a side wall of the leg unit blocks openings of engagement grooves of the slide plate, and when it rotates the leg unit in another direction, moves the part of the stopper along the connection hole of the leg unit, and slides the slide plate, engagement grooves of the slide plate and engagement holes of the leg unit are placed to overlap.

20 Claims, 26 Drawing Sheets

(51) Int. Cl.
*F16M 11/10* (2006.01)
*G06F 1/16* (2006.01)

(56) References Cited

U.S. PATENT DOCUMENTS

| | | | | |
|---|---|---|---|---|
| 7,614,599 | B2* | 11/2009 | Moon | H04M 1/04 248/455 |
| 7,878,474 | B1* | 2/2011 | Richer | F16M 13/005 248/351 |
| 8,328,153 | B2* | 12/2012 | Yang | F16M 11/10 248/370 |
| 8,387,938 | B2* | 3/2013 | Lin | G06F 1/166 248/397 |
| 9,013,865 | B2* | 4/2015 | Chen | F16M 13/005 361/679.21 |
| 2002/0130243 | A1 | 9/2002 | Ziegler et al. | |
| 2007/0221811 | A1* | 9/2007 | Hauser | A47B 23/043 248/454 |
| 2012/0275094 | A1 | 11/2012 | Zhou et al. | |
| 2020/0088344 | A1* | 3/2020 | Tsuji | H04M 1/04 |

FOREIGN PATENT DOCUMENTS

| | | |
|---|---|---|
| JP | 2016-025101 A | 2/2016 |
| JP | 2018-125675 A | 8/2018 |

OTHER PUBLICATIONS

International Search Report for PCT/JP2020/024679 dated Jul. 21, 2020 (PCT/ISA/210).

* cited by examiner

CASING ANGLE ADJUSTMENT MECHANISM AND ELECTRONIC DEVICE

CROSS REFERENCE TO RELATED APPLICATIONS

This application is a National Stage of International Application No. PCT/JP2020/024679 filed Jun. 23, 2020, claiming priority based on Japanese Patent Application No. 2019-146293 filed Aug. 8, 2019, the disclosure of which is incorporated herein in its entirety by reference.

TECHNICAL FIELD

The present disclosure relates to a casing angle adjustment mechanism and an electronic device.

BACKGROUND ART

In an electronic device such as a typical desktop telephone, it is preferred that the angle of its casing is adjustable with respect to a mounting surface of this electronic device. For example, the electronic device disclosed in Patent Literature 1 includes a stand arm and a lock arm are rotatably connected to the rear side of its casing, and a hook of the lock arm is inserted, in such a way that it can go round in one direction, into a round path formed on the inner side surface of the side wall of the stand arm. Latching parts are formed at intervals on the outward path of the round path of the stand arm, and the hook of the lock arm is latched into one latching part, and thereby the angle of the casing with respect to the mounting surface is fixed.

In such an electronic device, when changing the casing to a standing position, the lock arm is elastically deformed so that the hook comes out of the latching part and, for example, moved along the outward path of the round path and latched into the adjacent latching part. When changing the casing from an upright standing position to a lying position, the hook of the lock arm is moved along the return path of the round path and latched into the latching part on the outward path of the round path again.

CITATION LIST

Patent Literature

PTL1: Japanese Unexamined Patent Application Publication No. 2018-125675

SUMMARY OF INVENTION

Technical Problem

In the electronic device disclosed in Patent Literature 1, it is necessary to make the hook of the lock arm go round on the round path of the stand arm when adjusting the angle of the casing with respect to the mounting surface, and the operation of the stand arm for making the hook of the lock arm go round on the round path of the stand arm is complicated.

One of objects to be attained by an example embodiment disclosed in this specification is to provide a casing angle adjustment mechanism and an electronic device that contribute to solving this problem. Note that this object is no more than one of a plurality of objects to be achieved by a plurality of example embodiments disclosed in this specification. The other objects or problems and novel features will become apparent from the description of the specification or the accompanying drawings.

Solution to Problem

A casing angle adjustment mechanism according to a first aspect includes a slide plate, a leg unit configured to be rotatably connected to a rear side of a casing and allow the slide plate to be slidably inserted into the leg unit; and a stopper configured to be rotatably connected to the rear side of the casing, wherein the slide plate includes a plurality of engagement grooves formed on a surface of the slide plate, and a first protrusion and a second protrusion protruding from the surface of the slide plate and placed so that the plurality of engagement grooves are interposed therebetween, the leg unit includes a plurality of engagement holes formed on a side wall of the leg unit and corresponding to the plurality of engagement grooves of the slide plate, and a connection hole formed on the side wall of the leg unit so as to connect openings of the plurality of engagement holes, when, from a state where a part of the stopper is passed through the engagement groove of the slide plate and the engagement hole of the leg unit and an angle of the leg unit with respect to the casing is fixed, rotating the leg unit in one rotating direction relative to the casing, moving the part of the stopper to one side where the leg unit is connected to the casing along the connection hole of the leg unit, and sliding, through the first protrusion, the slide plate to the one side of the leg unit, a side wall of the slide plate blocks the openings of the engagement holes of the leg unit, and the side wall of the leg unit blocks openings of the engagement grooves of the slide plate when viewing the leg unit in a left-right direction, and when, from a state where the slide plate has slid in one direction, rotating the leg unit in another rotating direction relative to the casing, moving the part of the stopper to another side of the leg unit along the connection hole of the leg unit, and sliding, through the second protrusion, the slide plate to the another side of the leg unit, the plurality of engagement grooves of the slide plate and the plurality of engagement holes of the leg unit are placed to overlap when viewing the leg unit in a left-right direction.

An electronic device according to a second aspect includes a casing, and the above-described angle adjustment mechanism.

Advantageous Effects of Invention

According to the above-described aspects, a casing angle adjustment mechanism and an electronic device capable of adjusting the angle of a casing with respect to a mounting surface by a simple operation of a leg unit are achieved.

DESCRIPTION OF EMBODIMENTS

A preferred example embodiment of the present disclosure is described hereinafter with reference to the drawings. The present disclosure, however, is not limited to the below-descried example embodiment. The following description and the attached drawings are appropriately shortened and simplified to clarify the explanation.

Figure 1:
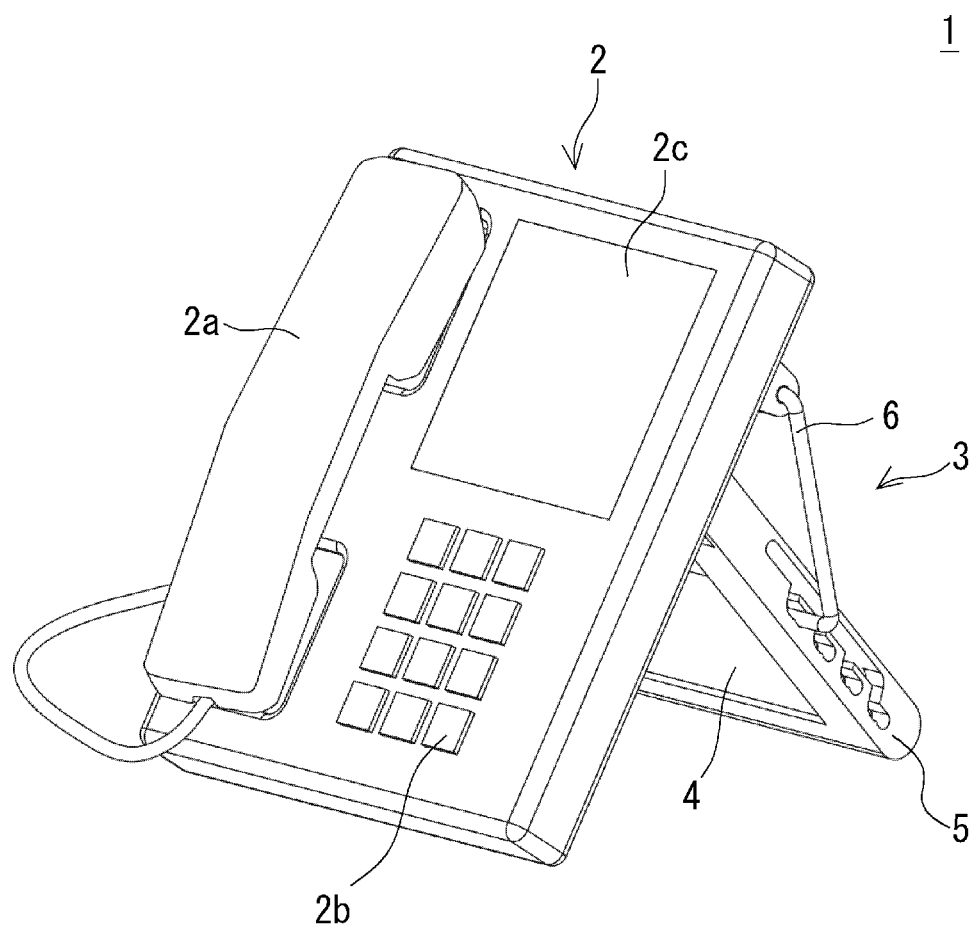
FIG. 1 is a perspective view schematically showing an electronic device according to an example embodiment.
Figure 2:
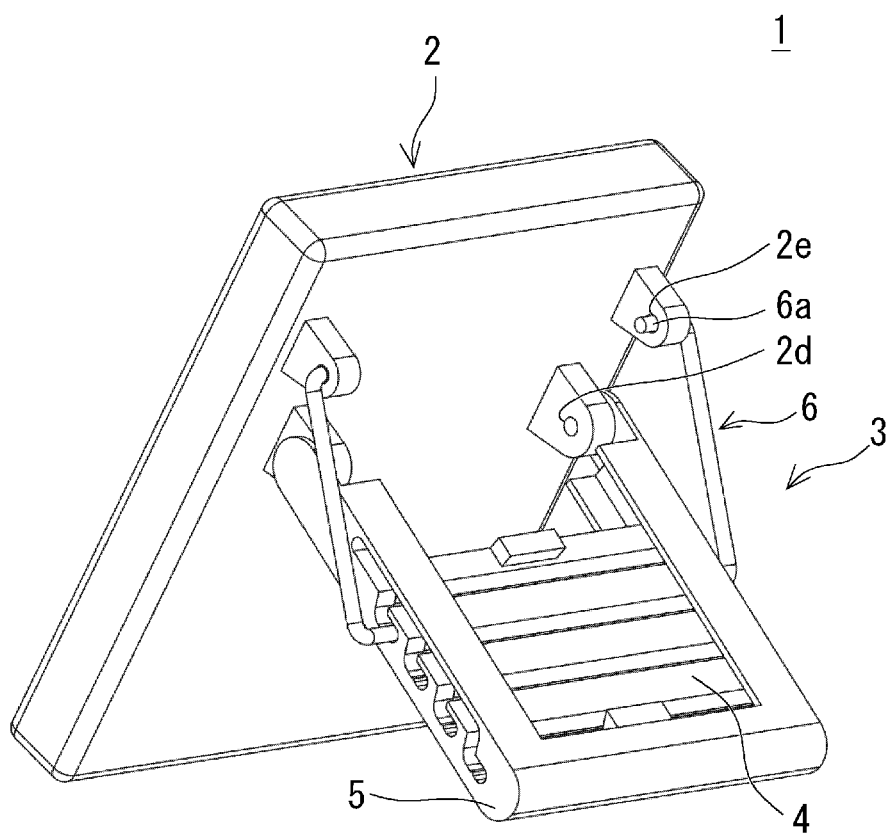
FIG. 2 is another perspective view schematically showing the electronic device according to the example embodiment.
Figure 3:
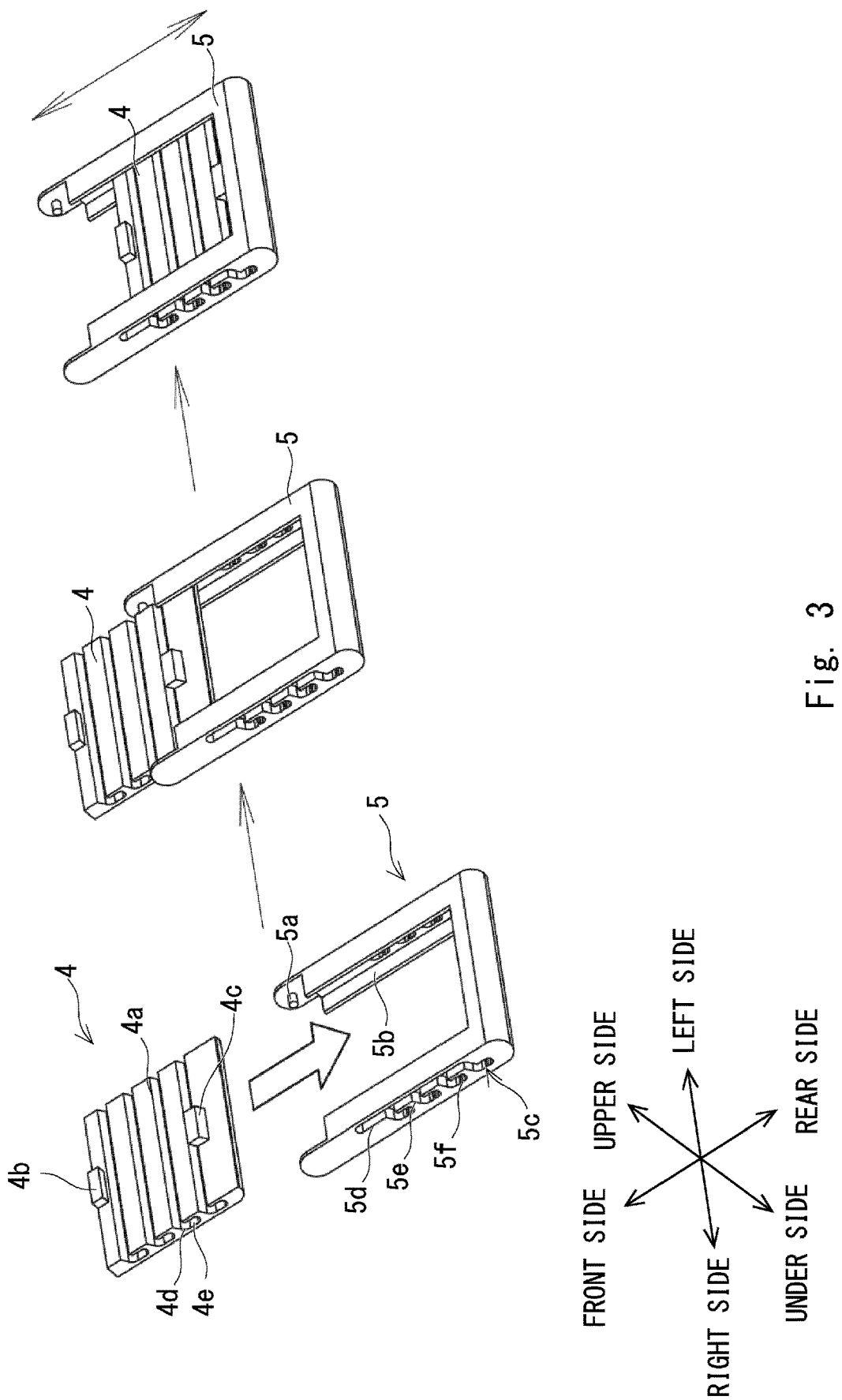
FIG. 3 is a view showing the flow of building an angle adjustment mechanism according to the example embodiment.
Figure 4:
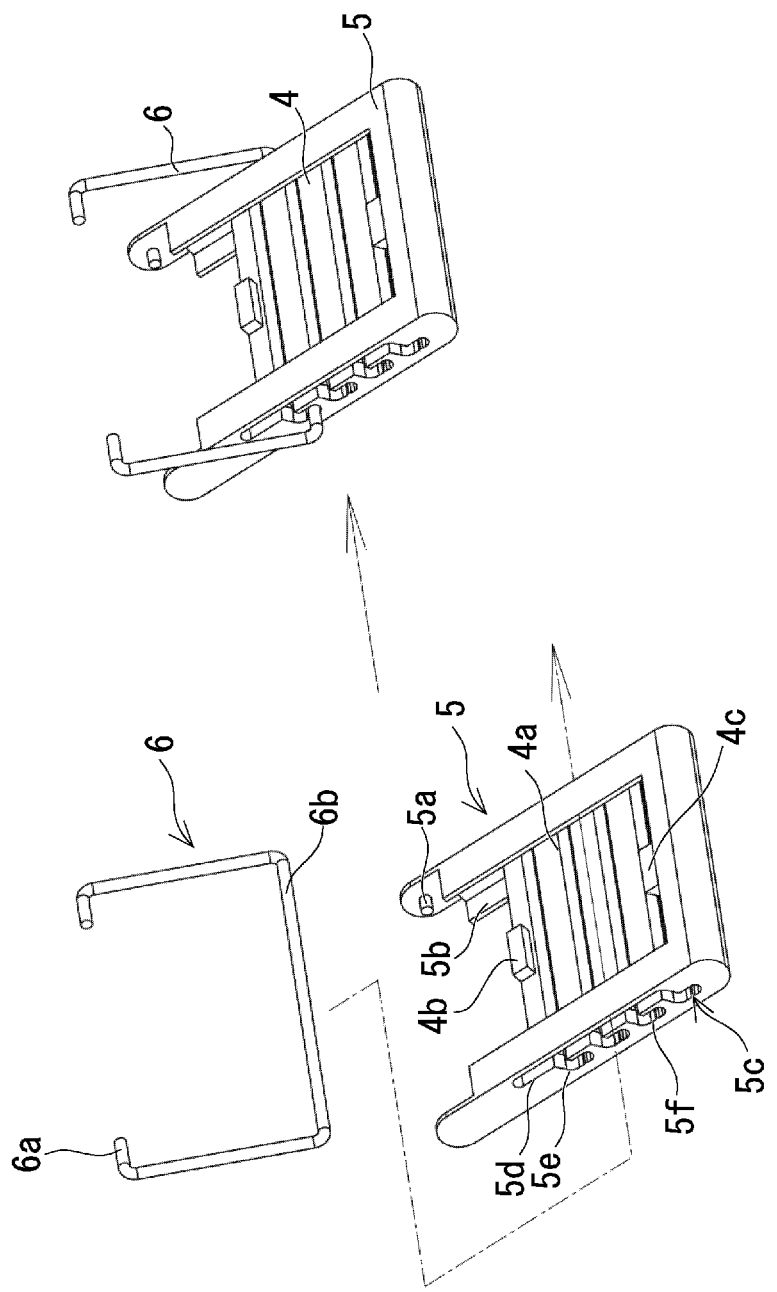
FIG. 4 is a view showing the flow of building the angle adjustment mechanism according to the example embodiment.
Figure 5:
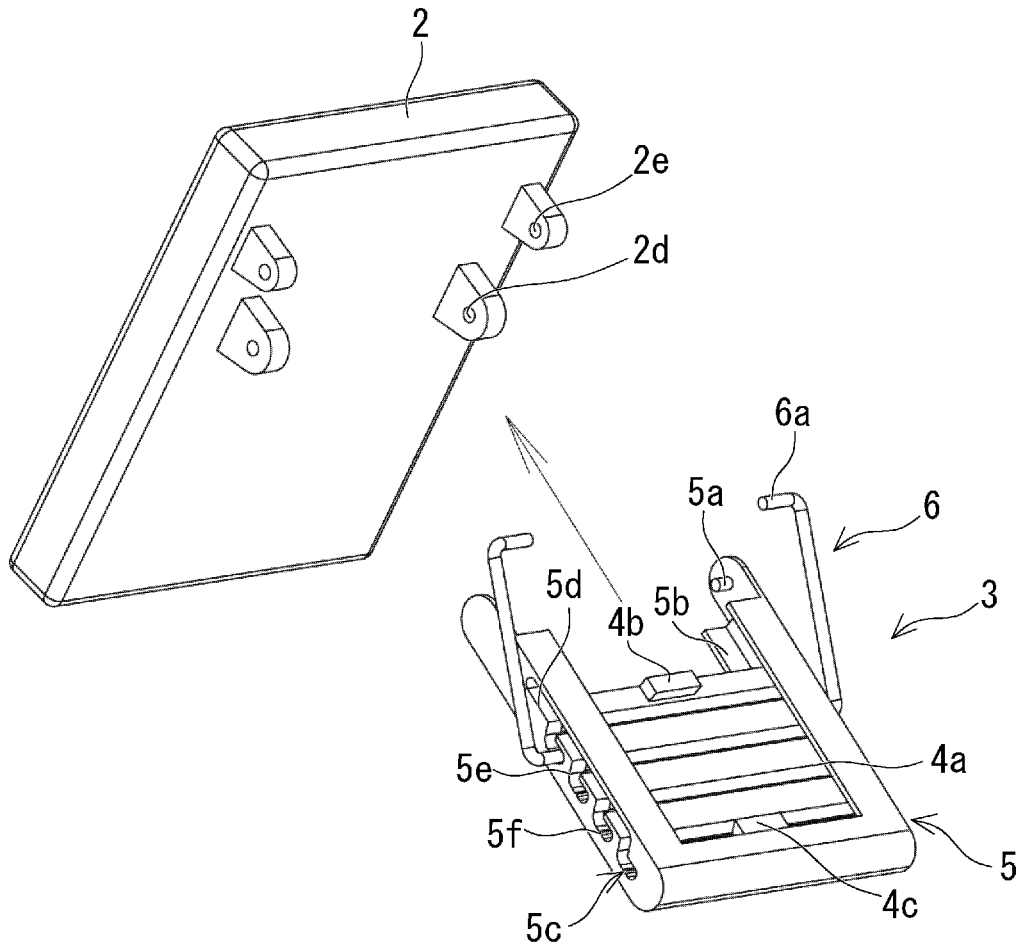
FIG. 5 is a view showing the flow of building the angle adjustment mechanism according to the example embodiment.
Figure 5:
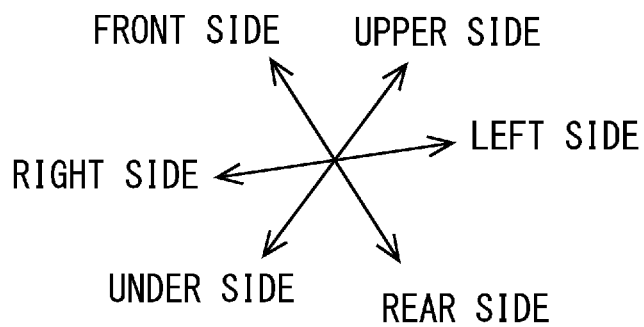

The structure of an electronic device using a casing angle adjustment mechanism (which is referred to simply as an angle adjustment mechanism in some cases below) according to an example embodiment is described first. FIG. 1 is a perspective view schematically showing the electronic device according to this example embodiment. FIG. 2 is another perspective view schematically showing the electronic device according to this example embodiment. FIGS. 3 to 5 are views showing the flow of building the angle adjustment mechanism according to this example embodiment.

An electronic device 1 is a desktop telephone as shown in FIGS. 1 and 2, for example. The electronic device 1 includes a casing 2 where a substrate for implementing functions as a desktop telephone or the like is mounted, and an angle adjustment mechanism 3. The casing 2 includes a handset 2a, dial buttons 2b, a display 2c, and so on. Note that the detailed description of the electronic device 1 is omitted because it is not the essential part of the present disclosure. Further, the electronic device 1 is not limited to a desktop telephone, and it may be any electronic device that includes a casing to be mounted on a mounting surface.

The angle adjustment mechanism 3 adjusts the angle of the casing 2 with respect to the mounting surface. The angle adjustment mechanism 3 includes a slide plate 4, a leg unit 5, and a stopper 6. The description of the slide plate 4, the leg unit 5, and the stopper 6 is based on the upper side, the under side, the front side, the rear side, the right side, and the left side defined in FIGS. 3 and 4.

As shown in the left part of FIG. 3, the slide plate 4 is a flat plate in a substantially rectangular shape in a basic form when viewed in the upper-lower direction, and it includes engagement grooves 4a, a first protrusion 4b, and a second protrusion 4c. The engagement grooves 4a are placed on the surface of the slide plate 4 at intervals in the front-rear direction of the slide plate 4.

The engagement grooves 4a extend in the left-right direction of the slide plate 4. The engagement grooves 4a include a first part (slope part) 4d that slopes toward the surface of the slide plate 4 as it approaches the front side of the slide plate 4, and a second part 4e that extends from the first part 4d toward the rear side of the slide plate 4 when viewing the slide plate 4 in the left-right direction.

The first protrusion 4b protrudes from the surface of the slide plate 4, and it is placed on the front side relative to the engagement groove 4a placed at the front-most position on the slide plate 4. For example, the first protrusion 4b is placed along the front side of the opening of the engagement groove 4a placed at the front-most position on the slide plate 4.

The second protrusion 4c protrudes from the surface of the slide plate 4, and it is placed on the rear side relative to the engagement groove 4a placed at the rear-most position on the slide plate 4. For example, the second protrusion 4c is placed along the rear side of the opening of the engagement groove 4a placed at the rear-most position on the slide plate 4. Thus, the first protrusion 4b and the second protrusion 4c are placed with the plurality of engagement grooves 4a interposed therebetween in the front-rear direction of the slide plate 4.

The leg unit 5 is U-shaped in a basic form when viewed in the upper-lower direction, and it includes a rotary shaft 5a, a groove part 5b, engagement holes 5c, and a connection hole 5d. The rotary shaft 5a protrudes from the front end of each of the left and right side walls of the leg unit 5 to the inside of the leg unit 5, and it is engaged into an engagement hole 2d on the rear side of the casing 2 as shown in FIG. 2. The leg unit 5 is thereby rotatable about the rotary shaft 5a with respect to the casing 2.

The groove part 5b is formed along the inner surfaces of the left and right side walls and the rear side wall of the leg unit 5, and the opening of the groove part 5b is on the inner side of the leg unit 5. For example, the longitudinal sectional shape of a part of the leg unit 5 where the groove part 5b is formed is a horizontal U-shape in a basic form. The height of the groove part 5b in the upper-lower direction is slightly greater than the height that is the sum of the thickness of the slide plate 4 in the upper-lower direction and the thickness of the stopper 6.

The edge of the slide plate 4 inserted into this groove part 5b. The slide plate 4 is thereby slidable relative to the leg unit 5 in the front-rear direction of the leg unit 5. Note that the groove part 5b that is formed on the rear side wall of the leg unit 5 may be omitted.

The positions and the shape of the engagement holes 5c correspond to those of the engagement grooves 4a of the slide plate 4. To be specific, left and right engagement holes 5c form a pair, and a plurality of pairs of engagement holes 5c of the same number as the number of the engagement grooves 4a of the slide plate 4 are formed on the left and right side walls of the leg unit 5. The plurality of pairs of engagement holes 5c are placed at substantially the same intervals as the intervals of the engagement grooves 4a of the slide plate 4 in the front-rear direction of the leg unit 5.

The interval between the engagement grooves 4a that are adjacent in the front-rear direction in the slide plate 4 is preferably greater than the width of the opening of the engagement hole 5 of the leg unit 5 in the front-rear direction. In other words, the interval between the engagement holes 5c that are adjacent in the front-rear direction in the leg unit 5 is preferably greater than the width of the opening of the engagement groove 4a of the slide plate 4 in the front-rear direction.

The engagement holes 5c include a first part (slope part) 5e that slopes toward the surface of the leg unit 5 as it approaches the front side of the leg unit 5, and a second part 5f that extends from the first part 5e toward the rear side of the leg unit 5 when viewing the leg unit 5 in the left-right direction, and the engagement holes 5c have substantially the same shape as the engagement grooves 4a of the slide plate 4.

The connection hole 5d is formed on each of the left and right side walls of the leg unit 5, and it connects the openings of the engagement holes 5c on each side wall. The connection hole 5d extends toward the front side of the leg unit 5, to the engagement hole 5c placed at the front-most position on the side wall of the leg unit 5.

For example, the connection hole 5d is longer than the width of the opening of the engagement groove 4a of the slide plate 4 in the front-rear direction and the width of the opening of the engagement hole 5c of the leg unit 5 in the front-rear direction and extends toward the front side of the leg unit 5, to the engagement hole 5c placed at the front-most position on the side wall of the leg unit 5.

As shown in the left part of FIG. 4, the stopper 6 is U-shaped in a basic form, and a rotary shaft 6a protrudes from each of both ends on the side with the opening of the stopper 6 to the inside of the stopper 6. The rotary shaft 6a extends in the left-right direction and is engaged into an engagement hole 2e on the rear side of the casing 2 as shown in FIG. 2.

The stopper 6 is thereby rotatable about the rotary shaft 6a with respect to the casing 2. A joining part 6b, which is located opposite to the rotary shaft 6a in the stopper 6, is passed through the slide plate 4 and the leg unit 5, which is described in detail later. The stopper 6 is preferably made of an elastically deformable material so that it is smoothly passed through the slide plate 4 and the leg unit 5 as described later.

The flow of building the angle adjustment mechanism 3 according to the example embodiment is described hereinafter. First, as shown in FIG. 3 from left to right, the edge of the slide plate 4 is inserted into the groove part 5b of the leg unit 5 so that the engagement grooves 4a of the slide plate 4 and the engagement holes 5c of the leg unit 5 overlap when viewing the leg unit 5 in the left-right direction.

Next, as shown in FIG. 4 from left to right, the stopper 6 is passed through the engagement groove 4a of the slide plate 4 and the engagement hole 5c of the leg unit 5, and the joining part 6b of the stopper 6 is engaged with the engagement groove 4a of the slide plate 4 and the engagement hole 5c of the leg unit 5.

Then, as shown in FIG. 5, the rotary shaft 5a of the leg unit 5 is engaged into the engagement hole 2d of the casing 2, and the rotary shaft 6a of the stopper 6 is engaged into the engagement hole 2e of the casing 2. The angle adjustment mechanism 3 is thereby built.

When the leg unit 5 and the casing 2 of this angle adjustment mechanism 3 are placed on a mounting surface, the joining part 6b of the stopper 6, which is engaged with the engagement groove 4a of the slide plate 4 and the engagement hole 5c of the leg unit 5, comes into contact with the rear end of the second part 4e of the engagement groove 4a and the rear end of the second part 5f of the engagement hole 5c, and thereby the casing 2 is supported at a specified angle with respect to the mounting surface.

Then, by selecting the engagement groove 4a of the slide plate 4 and the engagement hole 5c of the leg unit 5 with which the joining part 6b of the stopper 6 is to be engaged, the angle of the leg unit 5 with respect to the casing 2 and, by extension, the angle of the casing 2 with respect to the mounting surface are adjustable in the angle adjustment mechanism 3 as described in detail later.

The flow of adjusting the angle of the leg unit 5 with respect to the casing 2 by using the angle adjustment mechanism 3 according to this example embodiment is described hereinafter. The flow of reducing the angle of the leg unit 5 with respect to the casing 2 and thereby changing the casing 2 to a standing position on the mounting surface is described first.

Figure 6:
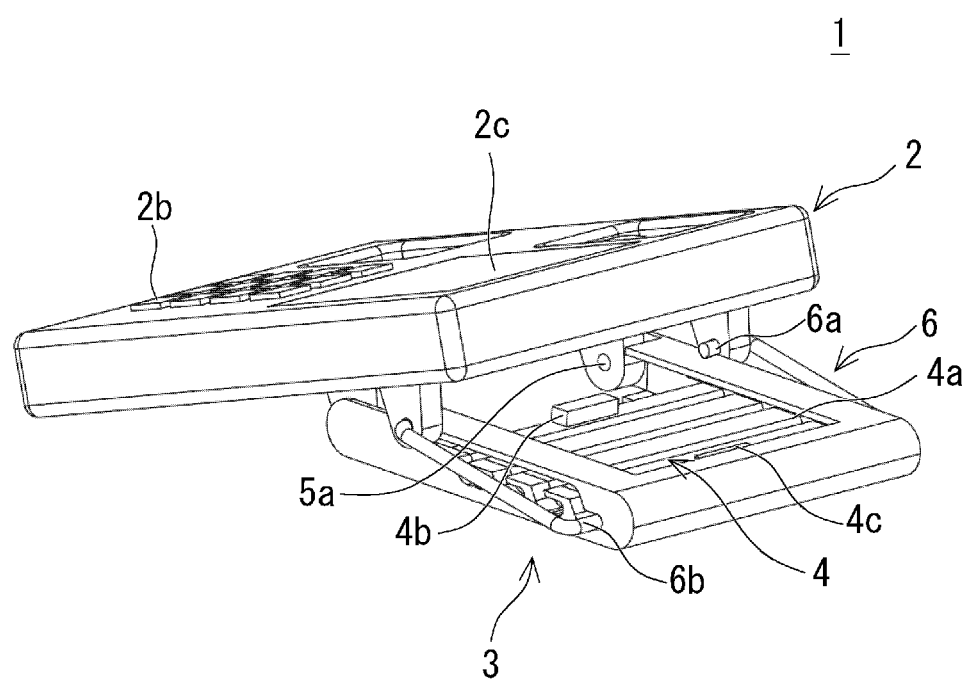
FIG. 6 is a perspective view showing the state where a joining part of a stopper is engaged with an engagement groove of a slide plate and an engagement hole of a leg unit.
Figure 7:
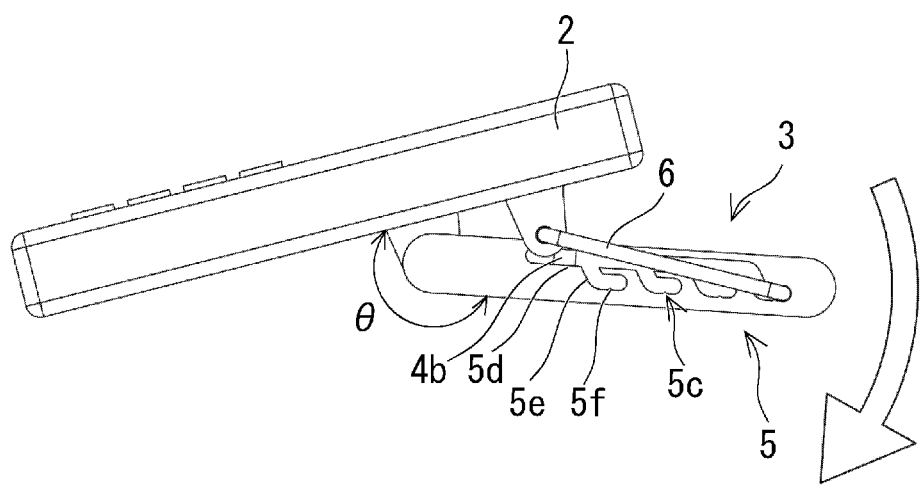
FIG. 7 is a side view showing the state where the joining part of the stopper is engaged with the engagement groove of the slide plate and the engagement hole of the leg unit.
Figure 8:
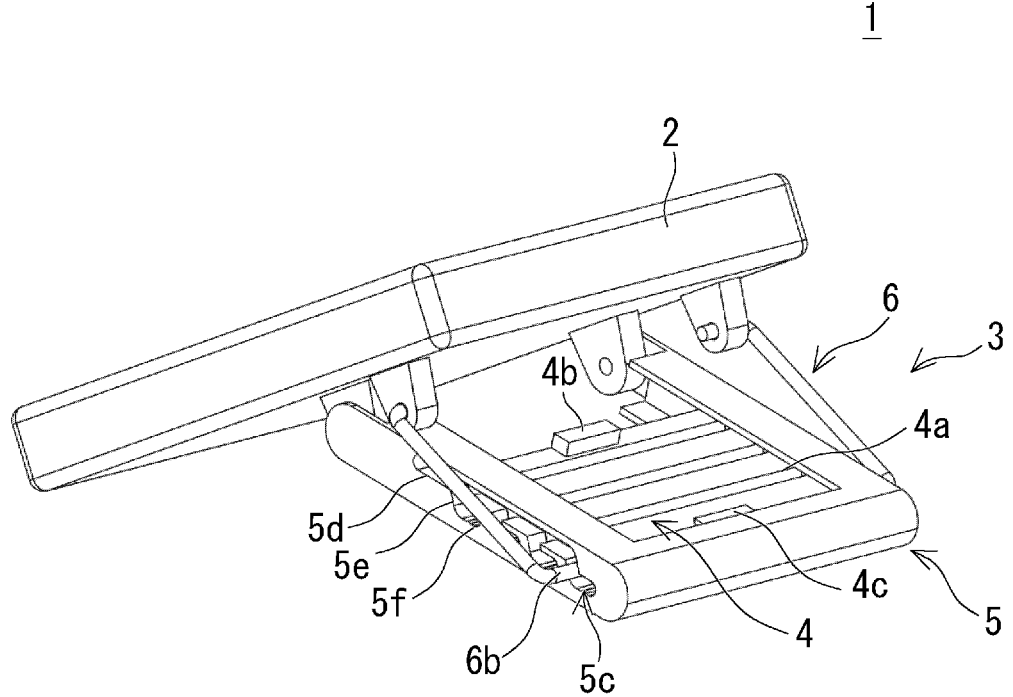
FIG. 8 is a perspective view showing the state where the joining part of the stopper comes out of the engagement groove of the slide plate and the engagement hole of the leg unit.
Figure 9:
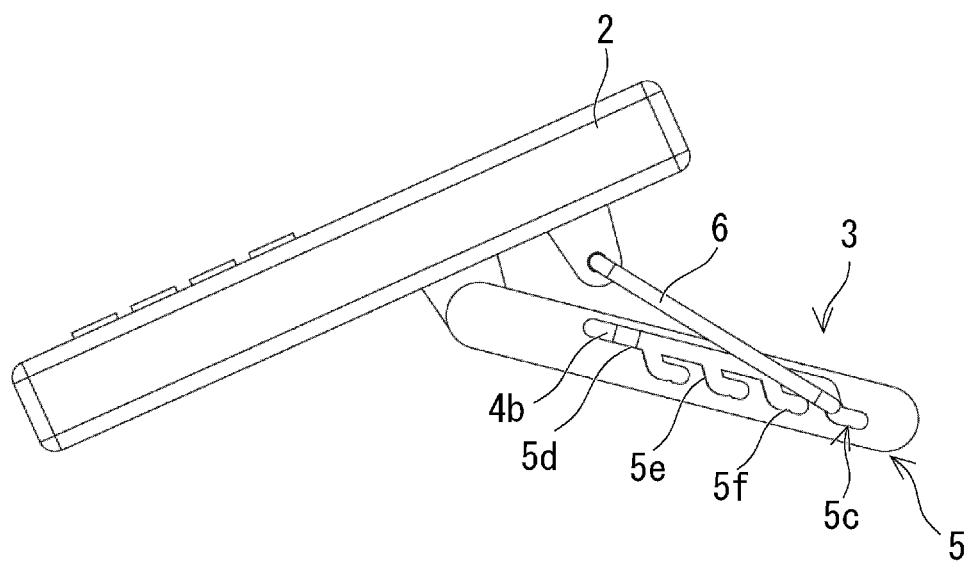
FIG. 9 is a side view showing the state where the joining part of the stopper comes out of the engagement groove of the slide plate and the engagement hole of the leg unit.
Figure 10:
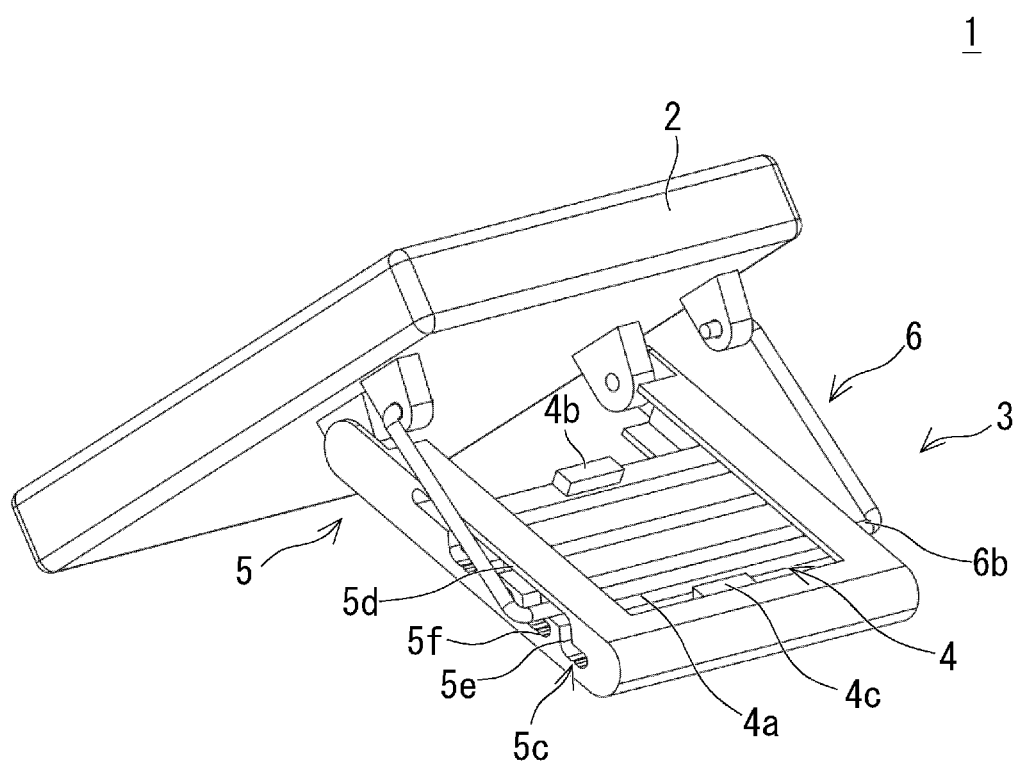
FIG. 10 is a perspective view showing the state where the joining part of the stopper moves on the surface of the slide plate toward the front side of the leg unit along a connection hole of the leg unit.
Figure 11:
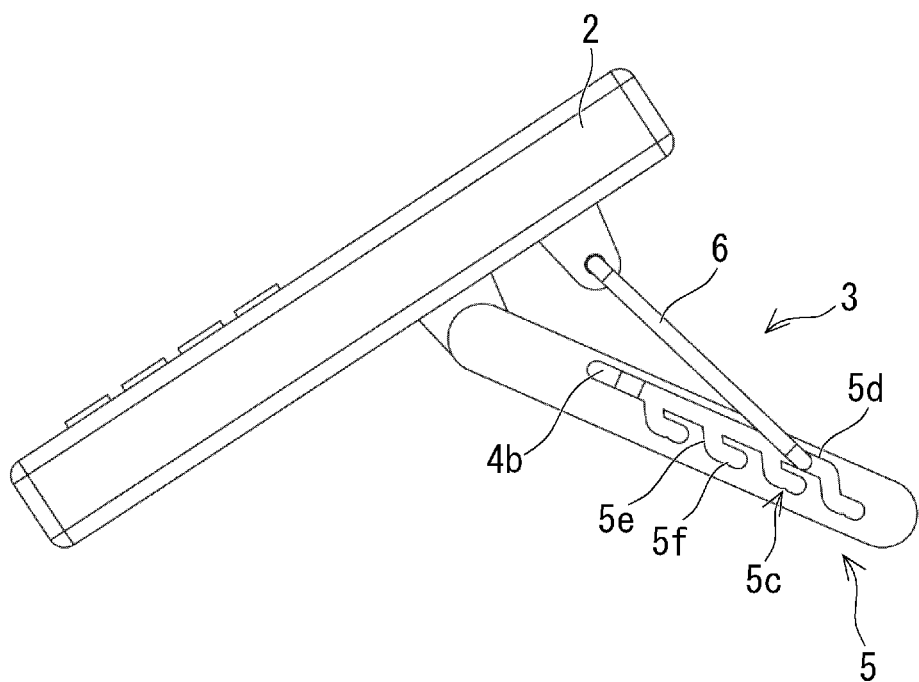
FIG. 11 is a side view showing the state where the joining part of the stopper moves on the surface of the slide plate toward the front side of the leg unit along the connection hole of the leg unit.
Figure 12:
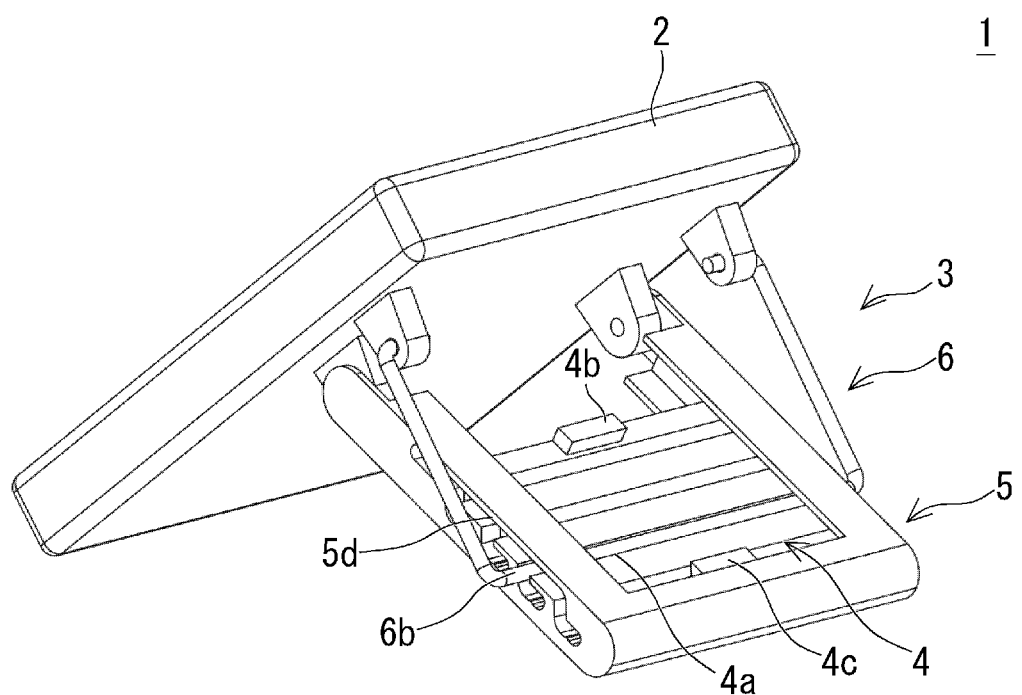
FIG. 12 is a perspective view showing the state where the joining part of the stopper is inserted into the adjacent engagement groove of the slide plate and the adjacent engagement hole of the leg unit.
Figure 13:
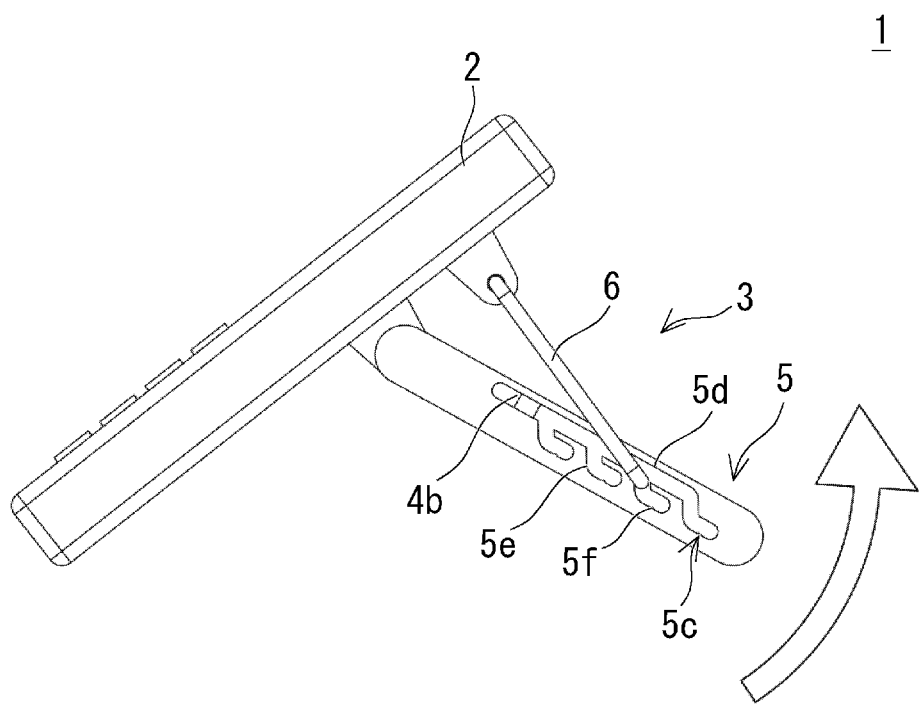
FIG. 13 is a side view showing the state where the joining part of the stopper is inserted into the adjacent engagement groove of the slide plate and the adjacent engagement hole of the leg unit.
Figure 14:
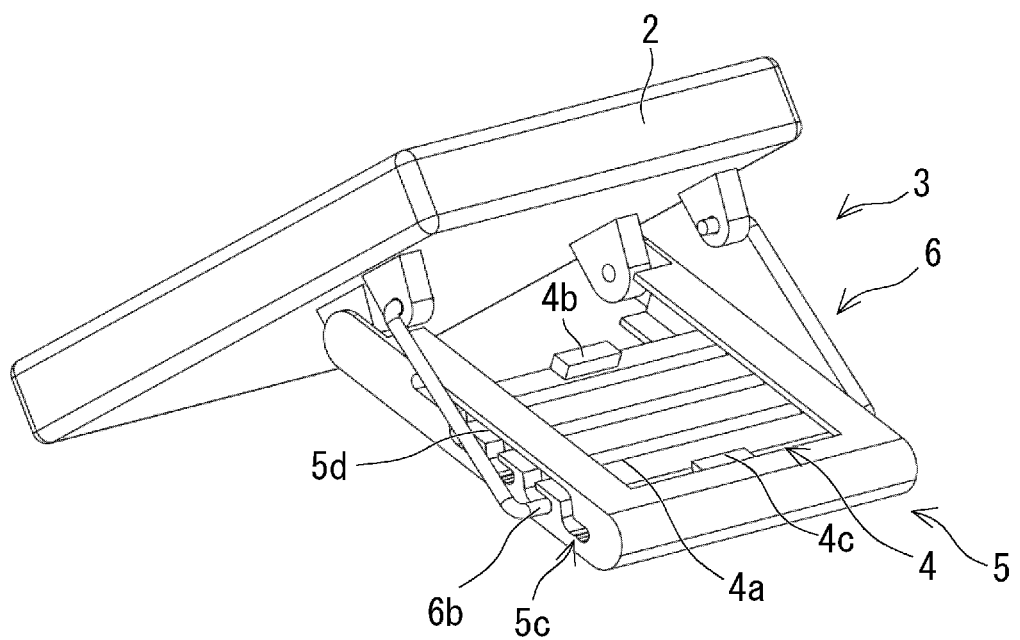
FIG. 14 is a perspective view showing the state where the joining part of the stopper is engaged with the adjacent engagement groove of the slide plate and the adjacent engagement hole of the leg unit.
Figure 15:
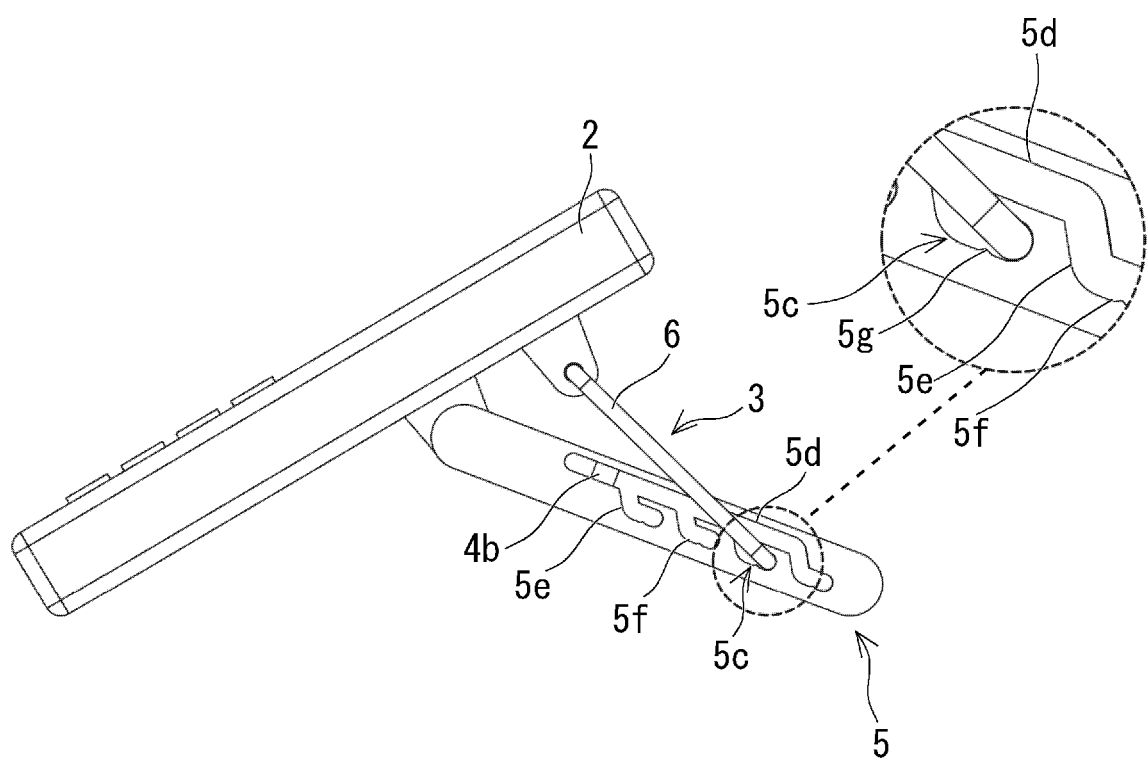
FIG. 15 is a side view showing the state where the joining part of the stopper is engaged with the adjacent engagement groove of the slide plate and the adjacent engagement hole of the leg unit.

FIGS. 6 and 7 are views showing the state where the joining part of the stopper is engaged with the engagement groove of the slide plate and the engagement hole of the leg unit. FIGS. 8 and 9 are views showing the state where the joining part of the stopper comes out of the engagement groove of the slide plate and the engagement hole of the leg unit. FIGS. 10 and 11 are views showing the state where the joining part of the stopper moves on the surface of the slide plate toward the front side of the leg unit along the connection hole of the leg unit. FIGS. 12 and 13 are views showing the state where the joining part of the stopper is inserted into the adjacent engagement groove of the slide plate and the adjacent engagement hole of the leg unit. FIGS. 14 and 15 are views showing the state where the joining part of the stopper is engaged with the adjacent engagement groove of the slide plate and the adjacent engagement hole of the leg unit. In each figure, the illustration of the handset 2a of the casing 2 is omitted.

As shown in FIGS. 6 and 7, it is assumed that the joining part 6b of the stopper 6 is engaged with the rear-most engagement groove 4a of the slide plate 4 and the rear-most engagement hole 5c of the leg unit 5 in a first initial state. It is also assumed that the slide plate 4 is placed at the rear-most position of the groove part 5b of the leg unit 5.

From this state, a user of the electronic device 1 first rotates the leg unit 5 in the direction of the arrow shown in FIG. 7, and thereby moves the joining part 6b of the stopper 6 to the opening of the engagement groove 4a of the slide plate 4 and the opening of the engagement hole 5c of the leg unit 5 as shown in FIGS. 8 and 9.

Since the first part 4d of the engagement groove 4a of the slide plate 4 slopes toward the surface of the slide plate 4 as it approaches the front side of the slide plate 4, and the first part 5e of the engagement hole 5c of the leg unit 5 slopes toward the surface of the leg unit 5 as it approaches the front side of the leg unit 5, the joining part 6b of the stopper 6 is smoothly moved to the opening of the engagement groove 4a and the opening of the engagement hole 5c.

When the user further rotates the leg unit 5 in the direction of the arrow shown in FIG. 7, the joining part 6b of the stopper 6 comes out of the engagement groove 4a of the slide plate 4 and also comes out of the engagement hole 5c of the leg unit 5, and moves on the surface of the slide plate 4 toward the front side of the leg unit 5 along the connection hole 5d of the leg unit 5 as shown in FIGS. 10 and 11.

As shown in FIGS. 12 and 13, when the joining part 6b of the stopper 6 reaches the opening of the engagement groove 4a that is placed immediately on the front side of the engagement groove 4a placed at the rear-most position on the slide plate 4 and the opening of the engagement hole 5c that is placed immediately on the front side of the engagement hole 5c placed at the rear-most position on the leg unit 5, the user rotates the leg unit 5 in the direction of the arrow shown in FIG. 13.

Then, as shown in FIGS. 14 and 15, the joining part 6b of the stopper 6 is engaged with the engagement groove 4a that is placed immediately on the front side of the engagement groove 4a placed at the rear-most position on the slide plate 4 and the engagement hole 5c that is placed immediately on the front side of the engagement hole 5c placed at the rear-most position on the leg unit 5, and the joining part 6b of the stopper 6 comes into contact with the rear ends of the engagement groove 4a and the engagement hole 5c.

Since the first part 4d of the engagement groove 4a of the slide plate 4 slopes toward the surface of the slide plate 4 as it approaches the front side of the slide plate 4, and the first part 5e of the engagement hole 5c of the leg unit 5 slopes toward the surface of the leg unit 5 as it approaches the front side of the leg unit 5, the joining part 6b of the stopper 6 is smoothly moved to the inside of the engagement groove 4a and the engagement hole 5c.

The electronic device 1 is thereby ready to be mounted on the mounting surface. By such a simple rotating operation that rotates the leg unit 5, the angle θ (see FIG. 7) of the leg unit 5 with respect to the casing 2 is reduced, so that the casing 2 changes into a standing position compared with the first initial state.

The leg unit 5 preferably has a latching part 5g in the engagement hole 5c as shown in the dashed line circle in FIG. 15. The latching part 5g comes into contact with the joining part 6b of the stopper 6 in the state where the joining part 6b is placed at the rear end of the second part 5f in the engagement hole 5c of the leg unit 5.

The latching part 5g protrudes, with a height that allows the joining part 6b of the stopper 6 to catch on, from the inner surface of the second part 5f of the engagement hole 5c of the leg unit 5. By this latching part 5g, the joining part 6b of the stopper 6 is latched at the rear end of the second part 5f of the engagement hole 5c of the leg unit 5, which prevents the joining part 6b of the stopper 6 from coming out of the engagement groove 4a of the slide plate 4 and the engagement hole 5c of the leg unit 5 when a force is suddenly applied on the leg unit 5 in the direction of the arrow shown in FIG. 7.

The latching part 5g is preferably formed in at least one of a pair of engagement holes 5c. The leg unit 5 is preferably made of an elastically deformable material so that the latching part 5g is elastically deformed when the stopper 6 moves past the latching part 5g along the engagement hole 5c. Note that, however, the latching part 5g may be an elastic body such as a spring that protrudes from the inner surface of the engagement hole 5c.

Further, although the joining part 6b of the stopper 6 is engaged with the engagement groove 4a that is placed immediately on the front side of the engagement groove 4a placed at the rear-most position on the slide plate 4 and the engagement hole 5c that is placed immediately on the front side of the engagement hole 5c placed at the rear-most position on the leg unit 5 in FIGS. 14 and 15, the engagement groove 4a and the engagement hole 5c which the joining part 6b of the stopper 6 is to be engaged with may be any engagement groove 4a and any engagement hole 5c that are placed on the front side of the engagement groove 4a and the engagement hole 5c which the joining part 6b of the stopper 6 is currently engaged with.

Figure 16:
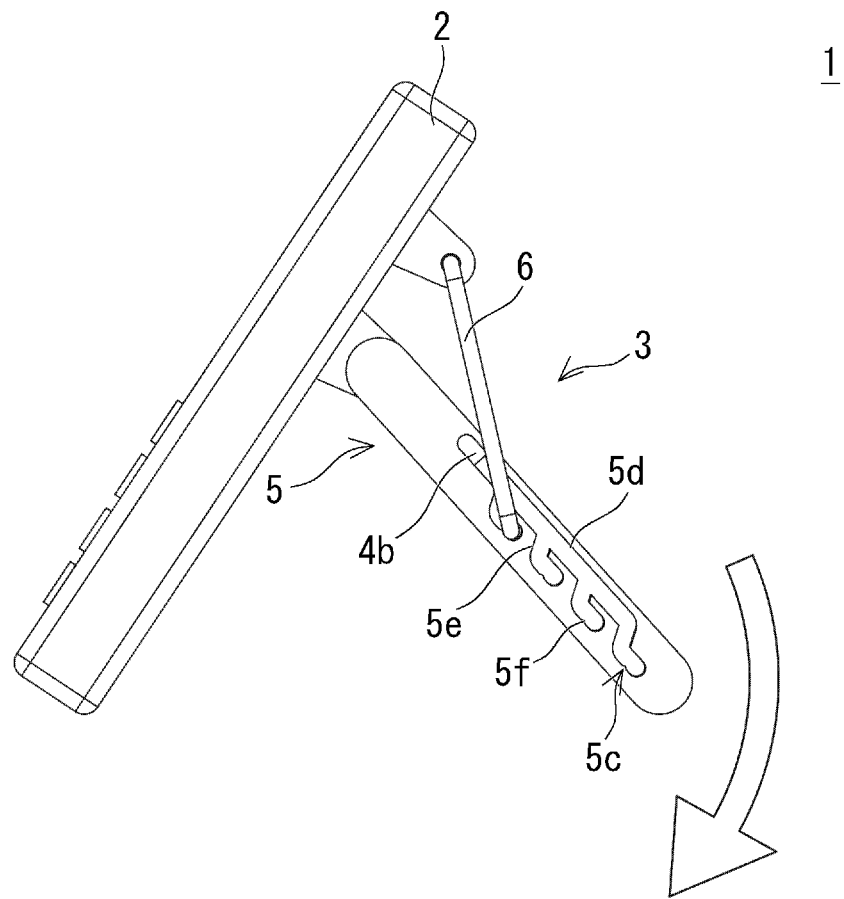
FIG. 16 is a view showing the state where the joining part of the stopper is engaged with the front-most engagement groove of the slide plate and the front-most engagement hole of the leg unit.
Figure 17:
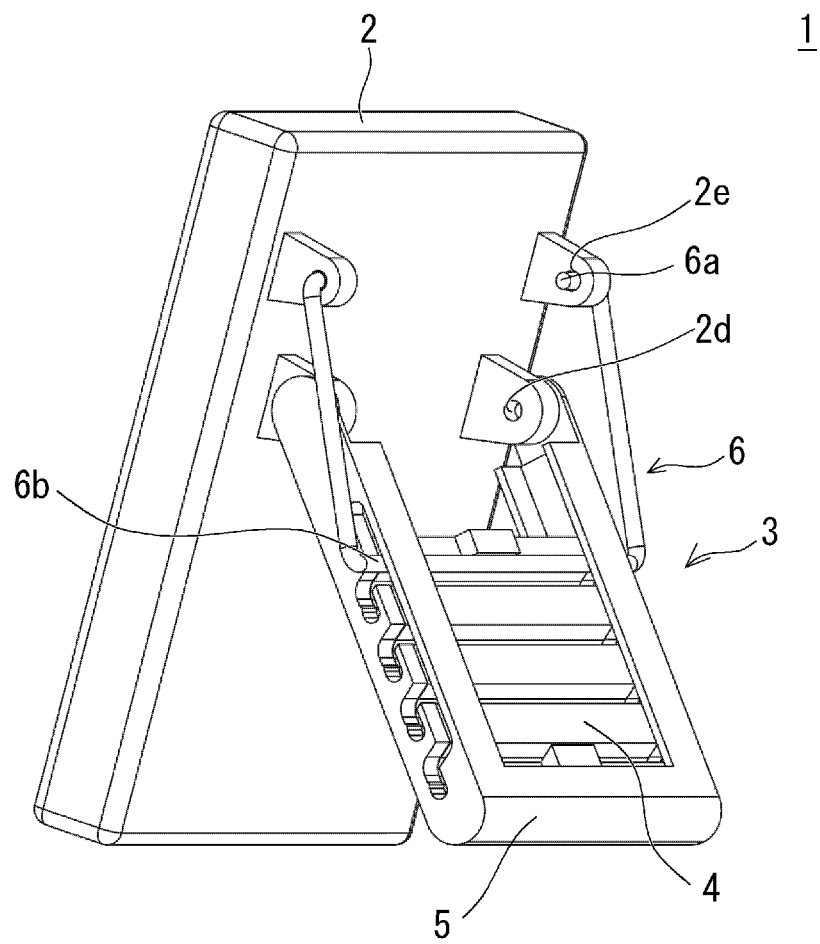
FIG. 17 is a perspective view showing the state where the joining part of the stopper comes out of the front-most engagement groove of the slide plate and the front-most engagement hole of the leg unit.
Figure 18:
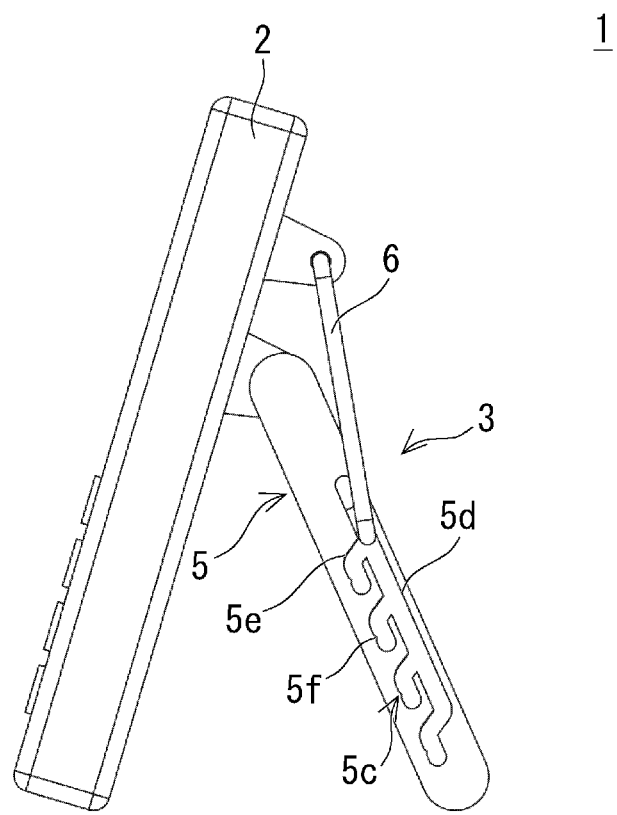
FIG. 18 is a side view showing the state where the joining part of the stopper comes out of the front-most engagement groove of the slide plate and the front-most engagement hole of the leg unit.
Figure 19:
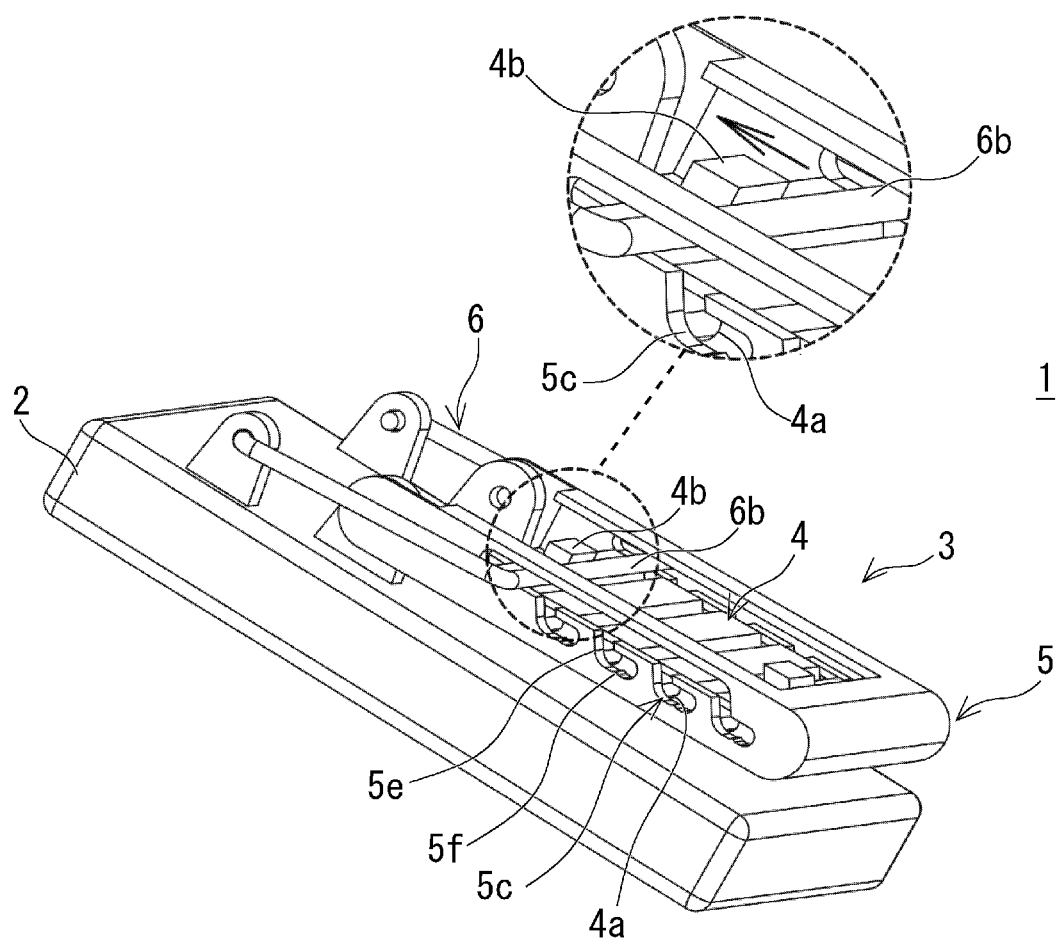
FIG. 19 is a perspective view showing the state where the joining part of the stopper moves on the surface of the slide plate toward the front side of the leg unit along the connection hole of the leg unit.
Figure 20:
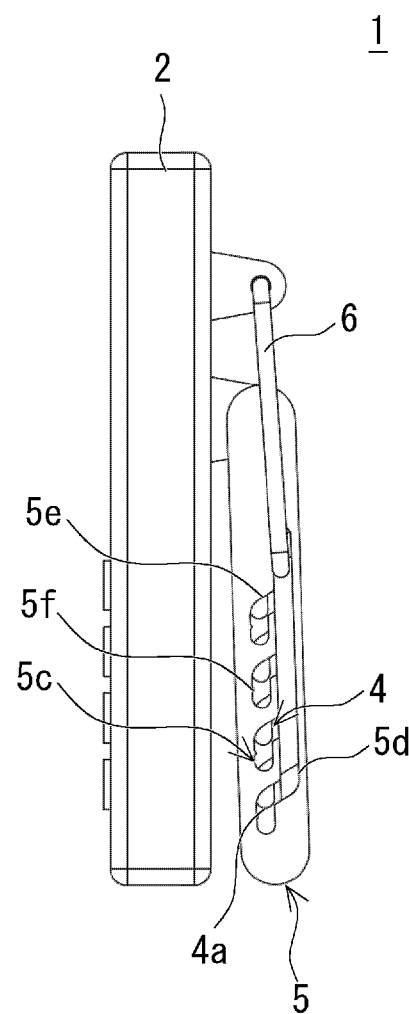
FIG. 20 is a side view showing the state where the joining part of the stopper moves on the surface of the slide plate toward the front side of the leg unit along the connection hole of the leg unit.
Figure 21:
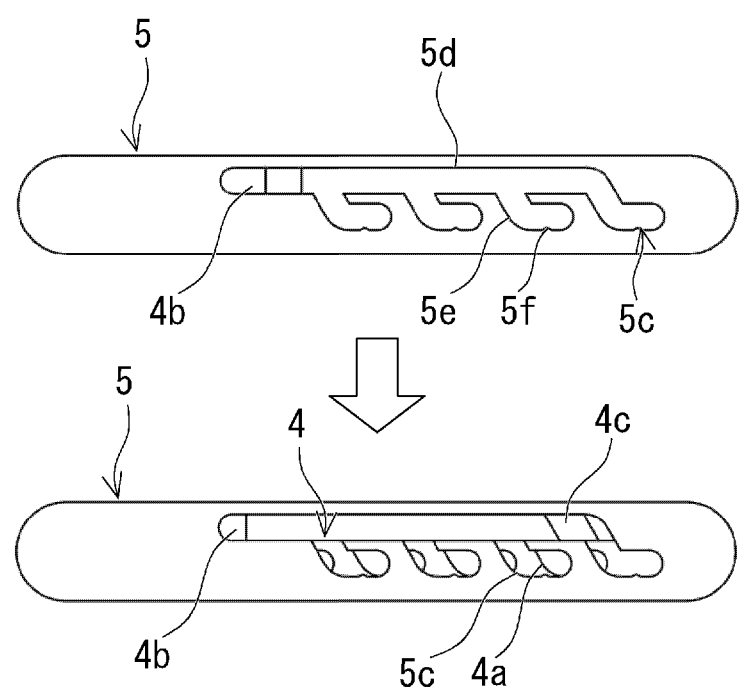
FIG. 21 is a view illustrating the state where the slide plate slides to the front side of the leg unit.
Figure 22:
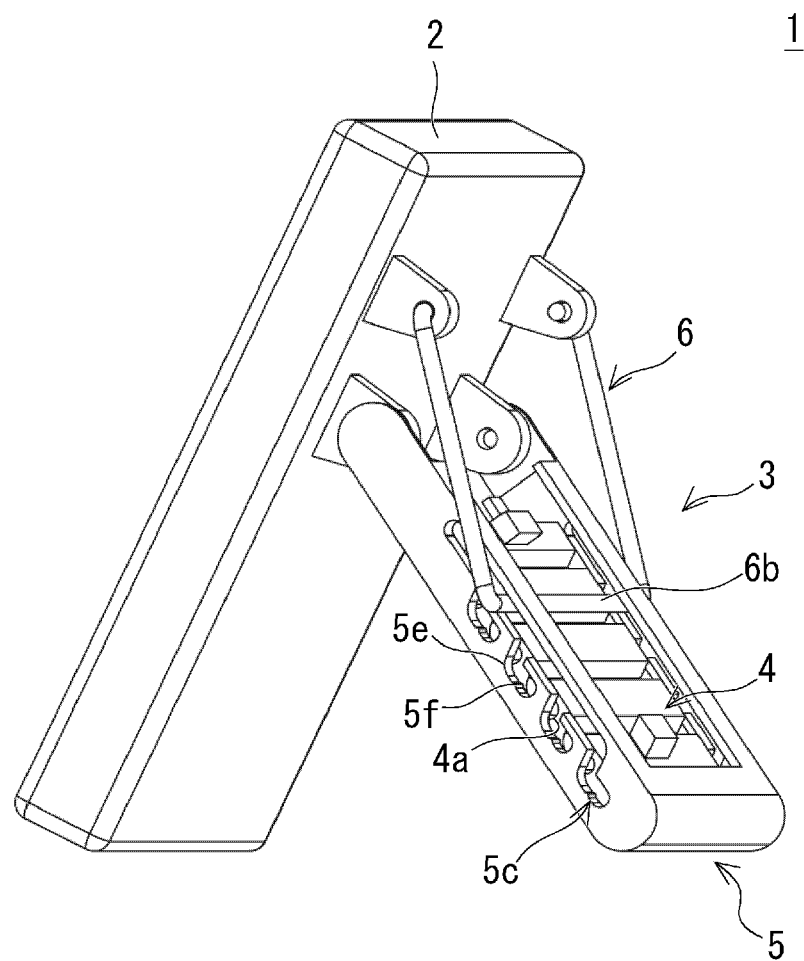
FIG. 22 is a perspective view showing the state where the joining part of the stopper moves on the surface of the slide plate toward the rear side of the leg unit along the connection hole of the leg unit.
Figure 23:
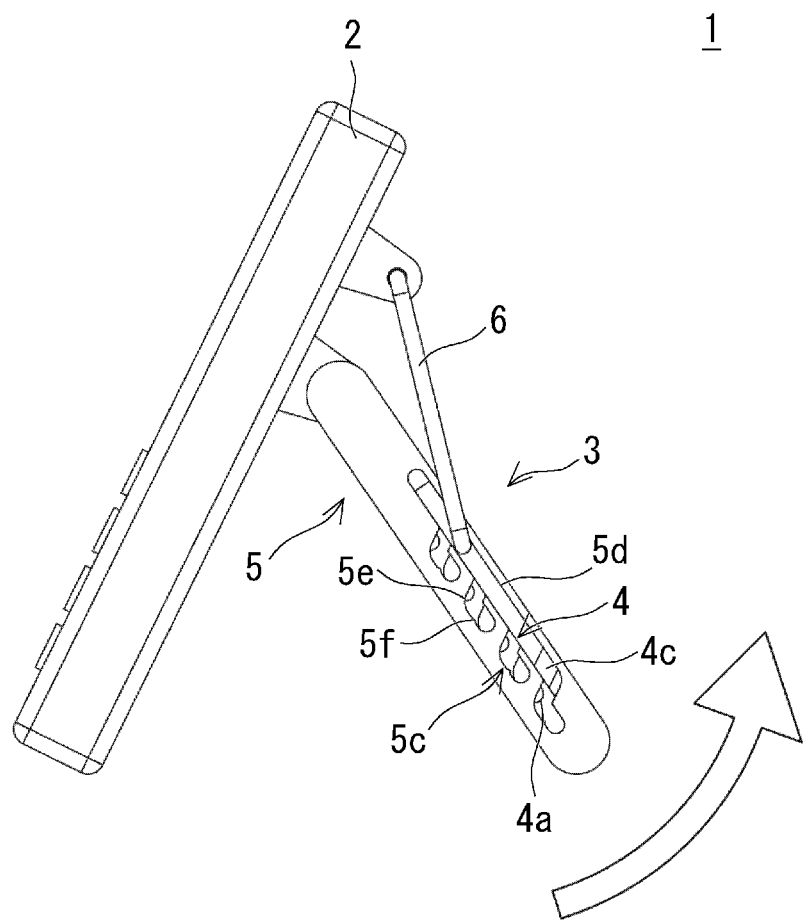
FIG. 23 is a side view showing the state where the joining part of the stopper moves on the surface of the slide plate toward the rear side of the leg unit along the connection hole of the leg unit.
Figure 24:
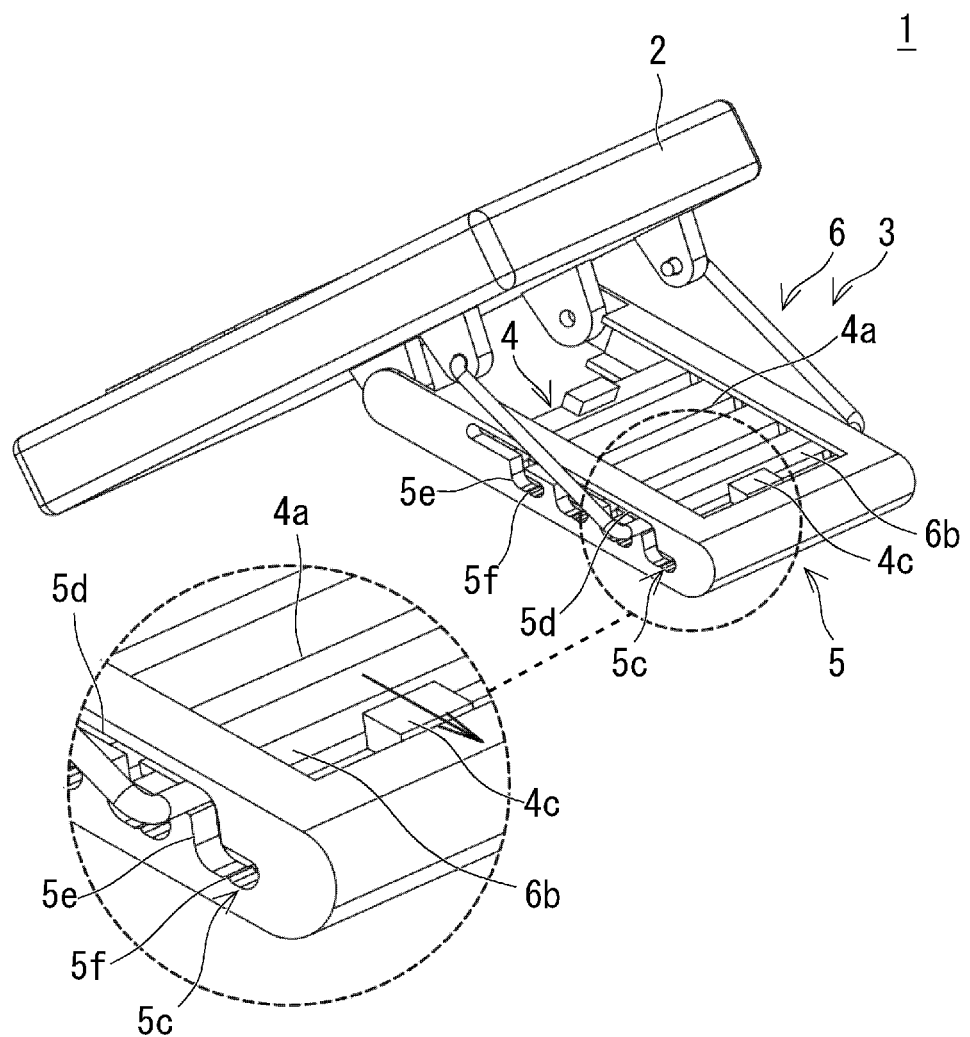
FIG. 24 is a perspective view showing the state where the joining part of the stopper pushes the second protrusion of the slide plate to the rear side of the leg unit.
Figure 25:
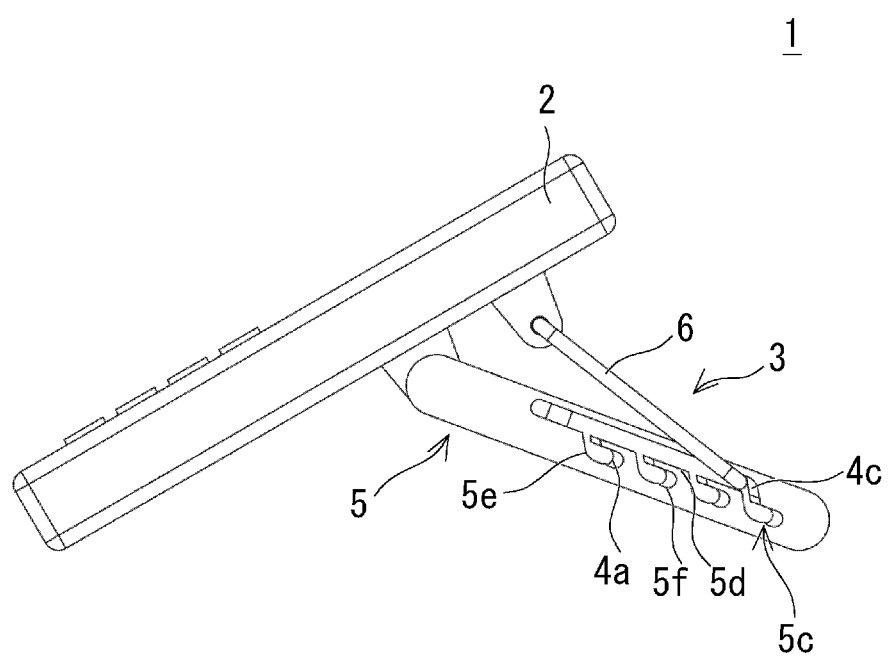
FIG. 25 is a side view showing the state where the joining part of the stopper pushes the second protrusion of the slide plate to the rear side of the leg unit.
Figure 26:
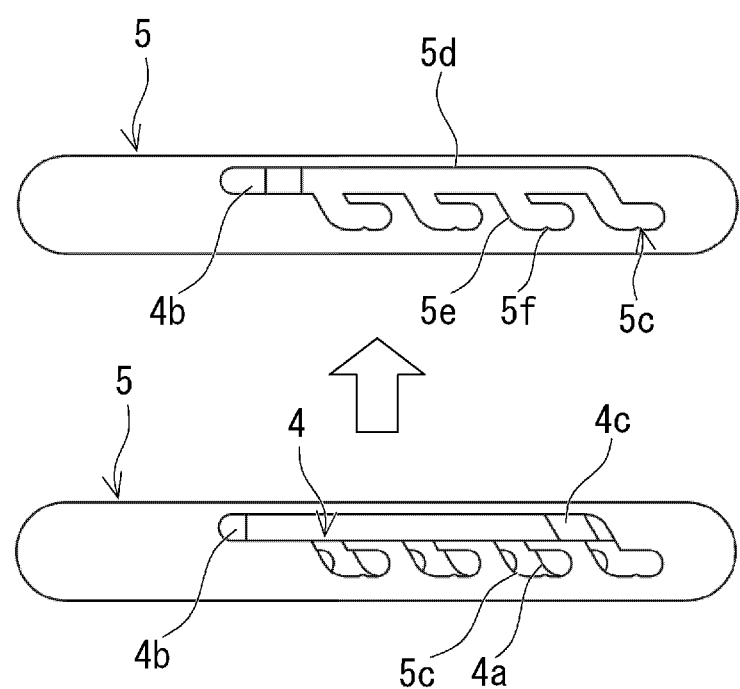
FIG. 26 is a view illustrating the state where the slide plate slides to the rear side of the leg unit.

Next, the flow of increasing the angle θ of the leg unit 5 with respect to the casing 2 and thereby changing the casing 2 from the above-described standing position to a lying position is described hereinafter. FIG. 16 is a view showing the state where the joining part of the stopper is engaged with the front-most engagement groove of the slide plate and the front-most engagement hole of the leg unit. FIGS. 17 and 18 are views showing the state where the joining part of the stopper comes out of the front-most engagement groove of the slide plate and the front-most engagement hole of the leg unit. FIGS. 19 and 20 are views showing the state where the joining part of the stopper moves on the surface of the slide plate toward the front side of the leg unit along the connection hole of the leg unit. FIG. 21 is a view illustrating the state where the slide plate slides to the front side of the leg unit. FIGS. 22 and 23 are views showing the state where the joining part of the stopper moves on the surface of the slide plate toward the rear side of the leg unit along the connection hole of the leg unit. FIGS. 24 and 25 are views showing the state where the joining part of the stopper pushes the second protrusion of the slide plate to the rear side of the leg unit. FIG. 26 is a view illustrating the state where the slide plate slides to the rear side of the leg unit. In each figure, the illustration of the handset 2a of the casing 2 is omitted.

As shown in FIGS. 2 and 16, it is assumed that the joining part 6b of the stopper 6 is engaged with the front-most engagement groove 4a of the slide plate 4 and the front-most engagement hole 5c of the leg unit 5 in a second initial state. It is also assumed that the slide plate 4 is placed at the rear-most position of the groove part 5b of the leg unit 5.

From this state, the user first rotates the leg unit 5 in the direction of the arrow shown in FIG. 16, and thereby moves the joining part 6b of the stopper 6 to the opening of the engagement groove 4a of the slide plate 4 and the opening of the engagement hole 5c of the leg unit 5 as shown in FIGS. 17 and 18.

When the user further rotates the leg unit 5 in the direction of the arrow shown in FIG. 16, the joining part 6b of the stopper 6 comes out of the engagement groove 4a of the slide plate 4 and also comes out of the engagement hole 5c of the leg unit 5, and the joining part 6b of the stopper 6 comes into contact with the first protrusion 4b of the slide plate 4 and moves on the surface of the slide plate 4 toward the front side of the leg unit 5 along the connection hole 5d of the leg unit 5, sliding the slide plate 4 through the first protrusion 4b toward the front side of the leg unit 5, as shown in FIGS. 19 and 20.

As a result, as shown in FIG. 21 from top to bottom, the state where the engagement groove 4a of the slide plate 4 and the engagement hole 5c of the leg unit 5 overlap changes into the state where at least part of the opening of the engagement groove 4a of the slide plate 4 is blocked with the side wall of the leg unit 5, and at least part of the opening of the engagement hole 5c of the leg unit 5 is blocked with the side wall of the slide plate 4 when viewed in the left-right direction of the leg unit 5.

After that, the user rotates the leg unit 5 in the direction of the arrow shown in FIG. 23, and the joining part 6b of the stopper 6 thereby moves on the surface of the slide plate 4 toward the rear side of the leg unit 5 along the connection hole 5d of the leg unit 5, as shown in FIGS. 22 and 23.

Since at least part of the opening of the engagement groove 4a of the slide plate 4 is blocked with the side wall of the leg unit 5, and at least part of the opening of the engagement hole 5c of the leg unit 5 is blocked with the side wall of the slide plate 4 when viewed in the left-right direction of the leg unit 5 as described above, the joining part 6b of the stopper 6 is prevented from catching on the engagement groove 4a of the slide plate 4 and the engagement hole 5c of the leg unit 5. This allows the joining part 6b of the stopper 6 to smoothly slide to the rear side of the leg unit 5.

When the user further rotates the leg unit 5 in the direction of the arrow shown in FIG. 23, the joining part 6b of the stopper 6 comes into contact with the second protrusion 4c of the slide plate 4 and moves on the surface of the slide plate 4 toward the rear side of the leg unit 5 along the connection hole 5d of the leg unit 5, sliding the slide plate 4 through the second protrusion 4c toward the rear side of the leg unit 5, as shown in FIGS. 24 and 25.

As a result, as shown in FIG. 26 from bottom to top, the state where at least part of the opening of the engagement groove 4a of the slide plate 4 is blocked with the side wall of the leg unit 5 and at least part of the opening of the engagement hole 5c of the leg unit 5 is blocked with the side wall of the slide plate 4 changes into the state where the engagement groove 4a of the slide plate 4 and the engagement hole 5c of the leg unit 5 overlap when viewed in the left-right direction of the leg unit 5. Note that, it is preferred that the engagement groove 4a of the slide plate 4 and the engagement hole 5c of the leg unit 5 overlap when the second protrusion 4c of the slide plate 4 comes into contact with the rear side wall of the leg unit 5.

Then, the user rotates the leg unit 5 in the direction of the arrow shown in FIG. 23, and the joining part 6b of the stopper 6 is engaged with the engagement groove 4a placed at the rear-most position on the slide plate 4 and the engagement hole 5c placed at the rear-most position on the leg unit 5, and the joining part 6b of the stopper 6 comes into contact with the rear ends of the engagement groove 4a and the engagement hole 5c as shown in FIGS. 6 and 7.

The electronic device 1 is thereby ready to be mounted on the mounting surface. By such a simple rotating operation that rotates the leg unit 5, the angle θ of the leg unit 5 with respect to the casing 2 is enlarged, so that the casing 2 changes into a lying position compared with the second initial state.

As described above, the electronic device 1 and the angle adjustment mechanism 3 according to this example embodiment are capable of changing the angle θ of the leg unit 5 with respect to the casing 2 and consequently changing the angle of the casing 2 with respect to the mounting surface by a simple rotating operation of the leg unit 5.

In addition, when moving the joining part 6b of the stopper 6 to the rear side of the leg unit 5, at least part of the opening of the engagement groove 4a of the slide plate 4 is covered with the side wall of the leg unit 5, and at least part of the opening of the engagement hole 5c of the leg unit 5 is covered with the side wall of the slide plate 4 when viewed in the left-right direction of the leg unit 5, and therefore the joining part 6b of the stopper 6 is prevented from catching on the engagement groove 4a of the slide plate 4 and the engagement hole 5c of the leg unit 5. This allows the joining part 6b of the stopper 6 to smoothly slide to the rear side of the leg unit 5.

Further, when the leg unit 5 includes the latching part 5g, the joining part 6b of the stopper 6 is prevented from coming out of the engagement groove 4a of the slide plate 4 and the engagement hole 5c of the leg unit 5 even when a force is suddenly applied on the leg unit 5 in the direction of the arrow shown in FIG. 7.

The above-described example embodiment is merely an exemplification of application of the technical idea obtained by the inventor of this disclosure. Therefore, this technical idea is not limited to the above-described example embodiment, and various changes and modifications may be made as a matter of course.

REFERENCE SIGNS LIST

1 ELECTRONIC DEVICE
2 CASING
2a HANDSET
2b DIAL BUTTON
2c DISPLAY
2d, 2e ENGAGEMENT HOLE
3 ANGLE ADJUSTMENT MECHANISM
4 SLIDE PLATE
4a ENGAGEMENT GROOVE
4b FIRST PROTRUSION
4c SECOND PROTRUSION
4d FIRST PART
4e SECOND PART

5 LEG UNIT
5a ROTARY SHAFT
5b GROOVE PART
5c ENGAGEMENT HOLE
5d CONNECTION HOLE
5e FIRST PART
5f SECOND PART
5g LATCHING PART
6 STOPPER
6a ROTARY SHAFT
6b JOINING PART

The invention claimed is:

1. A casing angle adjustment mechanism comprising:
a slide plate;
a leg unit configured to be rotatably connected to a rear side of a casing and allow the slide plate to be slidably inserted into the leg unit; and
a stopper configured to be rotatably connected to the rear side of the casing, wherein
the slide plate includes a plurality of engagement grooves formed on a surface of the slide plate, and a first protrusion and a second protrusion protruding from the surface of the slide plate and placed so that the plurality of engagement grooves are interposed therebetween,
the leg unit includes a plurality of engagement holes formed on a side wall of the leg unit and corresponding to the plurality of engagement grooves of the slide plate, and a connection hole formed on the side wall of the leg unit so as to connect openings of the plurality of engagement holes,
when, from a state where a part of the stopper is passed through the engagement groove of the slide plate and the engagement hole of the leg unit and an angle of the leg unit with respect to the casing is fixed, rotating the leg unit in one rotating direction relative to the casing, moving the part of the stopper to one side where the leg unit is connected to the casing along the connection hole of the leg unit, and sliding, through the first protrusion, the slide plate to the one side of the leg unit, a side wall of the slide plate blocks the openings of the engagement holes of the leg unit, and the side wall of the leg unit blocks openings of the engagement grooves of the slide plate when viewing the leg unit in a left-right direction, and
when, from a state where the slide plate has slid in one direction, rotating the leg unit in another rotating direction relative to the casing, moving the part of the stopper to another side of the leg unit along the connection hole of the leg unit, and sliding, through the second protrusion, the slide plate to the another side of the leg unit, the plurality of engagement grooves of the slide plate and the plurality of engagement holes of the leg unit are placed to overlap when viewing the leg unit in a left-right direction.

2. The casing angle adjustment mechanism according to claim 1, wherein the engagement hole of the leg unit includes a latching part to latch the part of the stopper inside the engagement hole of the leg unit.

3. The casing angle adjustment mechanism according to claim 1, wherein
the stopper is U-shaped, and
both ends on one side having an opening of the stopper being rotatably connected to the rear side of the casing, and another side being the part of the stopper that is passed through and engaged with the engagement groove of the slide plate and the engagement hole of the leg unit.

4. The casing angle adjustment mechanism according to claim 2, wherein
the stopper is U-shaped, and
both ends on one side having an opening of the stopper being rotatably connected to the rear side of the casing, and another side being the part of the stopper that is passed through and engaged with the engagement groove of the slide plate and the engagement hole of the leg unit.

5. The casing angle adjustment mechanism according claim 1, wherein the engagement groove of the slide plate includes a slope part sloping toward the surface of the slide plate as it approaches a side having the first protrusion.

6. The casing angle adjustment mechanism according claim 2, wherein the engagement groove of the slide plate includes a slope part sloping toward the surface of the slide plate as it approaches a side having the first protrusion.

7. The casing angle adjustment mechanism according claim 3, wherein the engagement groove of the slide plate includes a slope part sloping toward the surface of the slide plate as it approaches a side having the first protrusion.

8. The casing angle adjustment mechanism according claim 4, wherein the engagement groove of the slide plate includes a slope part sloping toward the surface of the slide plate as it approaches a side having the first protrusion.

9. The casing angle adjustment mechanism according to claim 1, wherein the engagement hole of the leg unit includes a slope part sloping toward a surface of the leg unit as it approaches the one side of the leg unit.

10. The casing angle adjustment mechanism according to claim 1, wherein an edge of the slide plate is slidably inserted into a groove part formed on the side wall of the leg unit.

11. An electronic device comprising:
a casing; and
the casing angle adjustment mechanism according to claim 1.

12. An electronic device comprising:
a casing; and
the casing angle adjustment mechanism according to claim 2.

13. An electronic device comprising:
a casing; and
the casing angle adjustment mechanism according to claim 3.

14. An electronic device comprising:
a casing; and
the casing angle adjustment mechanism according to claim 4.

15. An electronic device comprising:
a casing; and
the casing angle adjustment mechanism according to claim 5.

16. An electronic device comprising:
a casing; and
the casing angle adjustment mechanism according to claim 6.

17. An electronic device comprising:
a casing; and
the casing angle adjustment mechanism according to claim 7.

18. An electronic device comprising:
a casing; and
the casing angle adjustment mechanism according to claim 8.

19. An electronic device comprising:
a casing; and
the casing angle adjustment mechanism according to claim 9.

20. An electronic device comprising:
a casing; and
the casing angle adjustment mechanism according to claim 10.

\* \* \* \* \*